United States Patent [19]

Yoon et al.

[11] Patent Number: 5,458,786

[45] Date of Patent: Oct. 17, 1995

[54] METHOD FOR DEWATERING FINE COAL

[75] Inventors: Roe-Hoan Yoon; Gerald H. Luttrell, both of Blacksburg, Va.

[73] Assignees: The Center for Innovative Technology, Herndon; Virginia Polytechnic Institute & State University; Virginia Tech Intellectual Properties, Inc., both of Blacksburg, all of Va.

[21] Appl. No.: 229,012

[22] Filed: Apr. 18, 1994

[51] Int. Cl.$^6$ .................................................... C02F 1/54
[52] U.S. Cl. ............................ 210/711; 44/572; 44/626; 209/5; 210/712; 210/729; 210/770
[58] Field of Search ........................... 44/562, 572, 620, 44/626; 209/5; 210/710, 712, 729, 770, 711, 808, 769; 23/313 R

[56] References Cited

U.S. PATENT DOCUMENTS

| | | | |
|---|---|---|---|
| 3,992,784 | 11/1976 | Verschuur et al. | 34/12 |
| 4,290,896 | 9/1981 | Gordon et al. | 210/710 |
| 4,290,897 | 9/1981 | Swihart | 210/710 |
| 4,484,928 | 11/1984 | Keller, Jr. | 44/15 R |
| 4,552,077 | 11/1985 | Borio et al. | 110/347 |
| 4,670,159 | 6/1987 | Garrett et al. | 210/712 |
| 4,770,766 | 9/1988 | Keller et al. | 209/5 |
| 4,981,582 | 1/1991 | Yoon et al. | 209/164 |
| 5,087,269 | 2/1992 | Cha et al. | 44/626 |
| 5,167,798 | 12/1992 | Yoon et al. | 209/170 |

OTHER PUBLICATIONS

J. N. Israelachvilli and R. M. Pashley, "Measurement of the Hydrophobic Interaction between Two Hydrophobic Surfaces in Aqueous Electrolyte Solutions," Journal of Colloid and Interface Science, Apr. 1984, vol. 98, No. 2, pp. 500–514.

F. M. Fowkes, "Attractive Forces at Interfaces," Industrial and Engineering Chemistry, the Interface Symposium–5, Dec. 1964, vol. 56, No. 12, pp. 40–52.

"Development of the Licado Coal Cleaning Process," Final Report for Oct. 1, 1987 to Apr. 2, 1990, Customer Order No. DE–AC22–87PC79873, Westinghouse Electric Corporation, Advanced Energy Systems, P.O. Box 10864, Pittsburgh, Pa. 15236–0864, Jul. 31, 1990.

"Oil Agglomeration For Fine Coal Refuse Treatment," Stuart K. Nicol, World Coal, pp. 14–16.

Primary Examiner—Peter A. Hruskoci
Attorney, Agent, or Firm—Whitham, Curtis, Whitham & McGinn

[57] ABSTRACT

Fine coals are dewatered in an energy efficient process in which a non-polar liquid or a mixture of different hydrophobic liquids are used to displace the water from the coal surface. This process works with higher rank coals that are naturally hydrophobic so that the coal surface from which the water is displaced has a stronger affinity for the hydrophobic liquid than the water. Thermodynamically, this process is spontaneous and, hence, requires no energy. The only energy required for this process is to recover the spent hydrophobic liquid(s) for recycling purposes. The hydrophobic liquids are recovered in gaseous form either by lowering the pressure or by heating, and coverted back to liquid form for re-use. The most economical reagents that can be used for this purpose include propane, butane, pentane, and ethane. Carbon dioxide can also be used for the dewatering process described in the present invention. The process of dewatering by displacement is capable of achieving the same level of moisture reduction as thermal drying but at substantially lower energy costs.

4 Claims, 4 Drawing Sheets

100: Coal
200: Hydrophobic Liquid
300: Water

METHOD FOR DEWATERING FINE COAL

BACKGROUND OF THE INVENTION

1. Field of the Invention

The invention generally relates to processes and equipment for dewatering fine coal.

2. Description of the Prior Art

Most coals are cleaned at relatively coarse sizes typically in the range of two inches and 48 mesh. Finer coals are often discarded because of the high costs of processing. Although the amount of the fines discarded is relatively small as compared to the coarse particles that are cleaned, it represents a significant loss of valuable resources and creates environmental problems. It is estimated that there are approximately 500–2,000 million tons of the fine coals in abandoned refuse ponds and 500–800 million tons of fines in active refuse ponds in the U.S. Despite the technological advancement made in recent years, the U.S. coal industry is still discarding 30–50 million tons of the fine coal to refuse ponds.

There are two reasons for the high costs of processing fine coals. One is the low efficiency of cleaning and the other is associated with the high cost of dewatering. The first problem has been resolved to a large extent by the advent of advance coal cleaning technologies such as microbubble column floatation and selective agglomeration. These water-based processes are capable of recovering the fine coal from finely dispersed ash- and $SO_2$-forming minerals; however, it is difficult to remove the free water adhering to the surfaces of the fine coal particles. The finer the particle, the larger the surface area and, hence, the more difficult it becomes to dewater the clean coal product. Typically, 100 mesh×0 flotation products contain 30–40% moisture after a mechanical dewatering process such as vacuum filtration, causing not only a loss of heating values, but also problems with handling and transportation. Some consider that cleaning fine coal replaces one type of inert substance (i.e., ash-forming minerals) by another (i.e., water), offering no financial incentives for coal companies to clean fine coals. Thermal drying can remove the moisture, but it is costly and usually requires cumbersome permitting processes. The costs of thermal drying is estimated in the range of $2–25 per ton of coal, which are substantially higher than those for mechanical dewatering processes.

Many investigators suggested methods of improving the efficiency of mechanically removing water from bituminous coal fines. These include polymer addition, surfactant addition and use of electrical or acoustic energy to aid in the dewatering process. Some of these methods showed improvements in dewatering rate, but not necessarily in reducing the final moisture content. The use of high pressure filters vastly improved the kinetics and reduced the final moisture contents beyond what can be achieved with conventional vacuum filters; however, the final moisture contents are still far above the levels that can be achieved by thermal drying. Furthermore, the high-pressure filters suffer from high capital and maintenance costs.

The most commonly used mechanical dewatering devices are vacuum filters. With this technique, the finer particles fill the voids between coarser particles in the filter cake, significantly increasing the pressure drop. Various flocculating agents, such as organopolysiloxanes as disclosed in U.S. Pat. Nos. 4,290,896 and 4,290,897, are designed to minimize the blockage by flocculating the particles and thereby increase the filtration rate. Various surfactants have also been used as dewatering aids, the role of which is to increase the filtration rate rather than reduce the final moisture content.

There is an entirely different kind of dewatering problem than discussed above facing the coal industry. The low-rank coals mined in the western U.S. contain 30–35% moisture as they are formed underground. The water in these coals are referred to as inherent moisture as it constitutes an integral part of the coal structure, and is distinguished from the free moisture adhering to the surface of higher-rank coals. The only way to remove the inherent moisture is to subject the coal to high pressure and/or temperature, which is substantially more costly than removing the free moisture from the higher-rank coals such as bituminous coals. There are many different methods of upgrading low-rank coals by removing the inherent moisture.

Some of the low-rank coal beneficiation techniques describe methods of removing water after removing the inherent moisture. For example, U.S. Pat. No. 4,185,395 to Nakako et al. discloses a method in which brown coal mixed with hydrocarbon oil is heated to 100°–130° C. and then passed through a gas-liquid separation process to separate the slurry into a stream containing the hydrocarbon vapor and a dehydrated slurry. The hydrocarbon oil is recycled in the process. The Nakako et al. process suffers from the drawback that it is a thermal drying process which is energy intensive.

The U.S. Pat. No. 3,992,784 to Verschuur et al. also discloses a method of heating an aqueous slurry of brown coal to 150° C. in the presence of hydrocarbon oils. In the example experiments $n-C_{12}$ hydrocarbon oils have been used to obtain products containing moisture in the range of 31 to 54%.

SUMMARY OF THE INVENTION

It is an object of this invention to provide an inexpensive, less energy intensive means of dewatering fine coal.

According to the invention, a coal slurry is pumped into a mixing chamber along with a gas that can be converted into a non-polar, hydrophobic liquid. The pressure within the chamber is maintained sufficiently high enough to condense the gas into its liquid form. The hydrophobic liquid formed as a result of the condensation displaces the water from the surface of a coal because it has a higher affinity for the hydrophobic coal surface than does the water for the coal surface. When sufficient amount of the hydrophobic liquid is used, each coal particle is completely encapsulated by a film of the hydrophobic liquid without leaving water in between. The mixture of coal, water, and non-polar liquid is then passed into another chamber in which the coal and hydrophobic liquid are phase-separated from the displaced water. The hydrophobic liquid can be recovered from the coal either by lowering the pressure or by increasing the temperature above its boiling point. The recovered hydrophobic liquid is converted back to its gaseous form and recycled.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
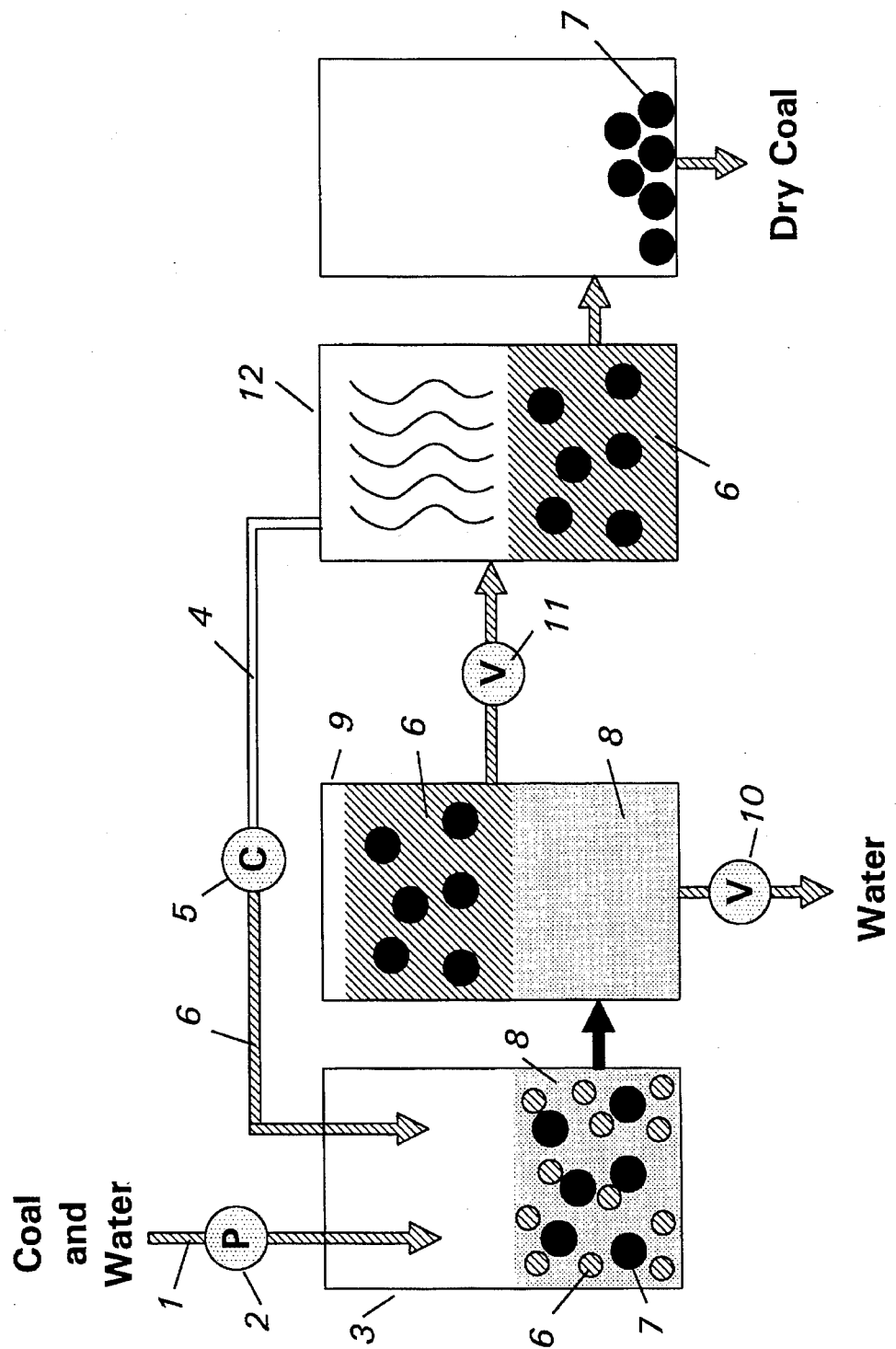
FIG. 1 is a schematic diagram showing the conceptual flow sheet used to dewater fine coals.

Referring now to the drawings, and more particularly to FIG. 1, which is designed to explain the process concept schematically, an aqueous coal slurry 1 is directed by a suitable means such as pump 2 into a mixing chamber 3, in which a non-polar gas 4 is also introduced. The gas is pressurized or cooled by suitable means 5 to condense the gas into a liquid form 6, which is non-polar and hydrophobic. The hydrophobic liquid displaces the water from the surface of coal 7 and spreads on the surface forming a film, provided that the coal has a stronger affinity for the hydrophobic liquid than for the water. The mixture of the coal 7, water 8 and hydrophobic liquid 6 is then moved to another chamber 9, where the hydrophobic liquid 6 containing coal particles 7 are phase-separated from water 8 by allowing a quiescent condition. The water is discarded by a suitable means 10, while the hydrophobic liquid 6 containing coal particles is transferred by appropriate means 11 to a third vessel 12, where the pressure is released or the temperature is raised above the boiling point in order to transform the hydrophobic liquid 6 into a gaseous phase 4 as a means of separating it from the coal. The non-polar gas 4 is transformed back to its liquid form 6 by suitable means 5 before being returned to the mixing chamber 3 for reuse, while the dry coal product 7 is removed for shipment.

Figure 2:
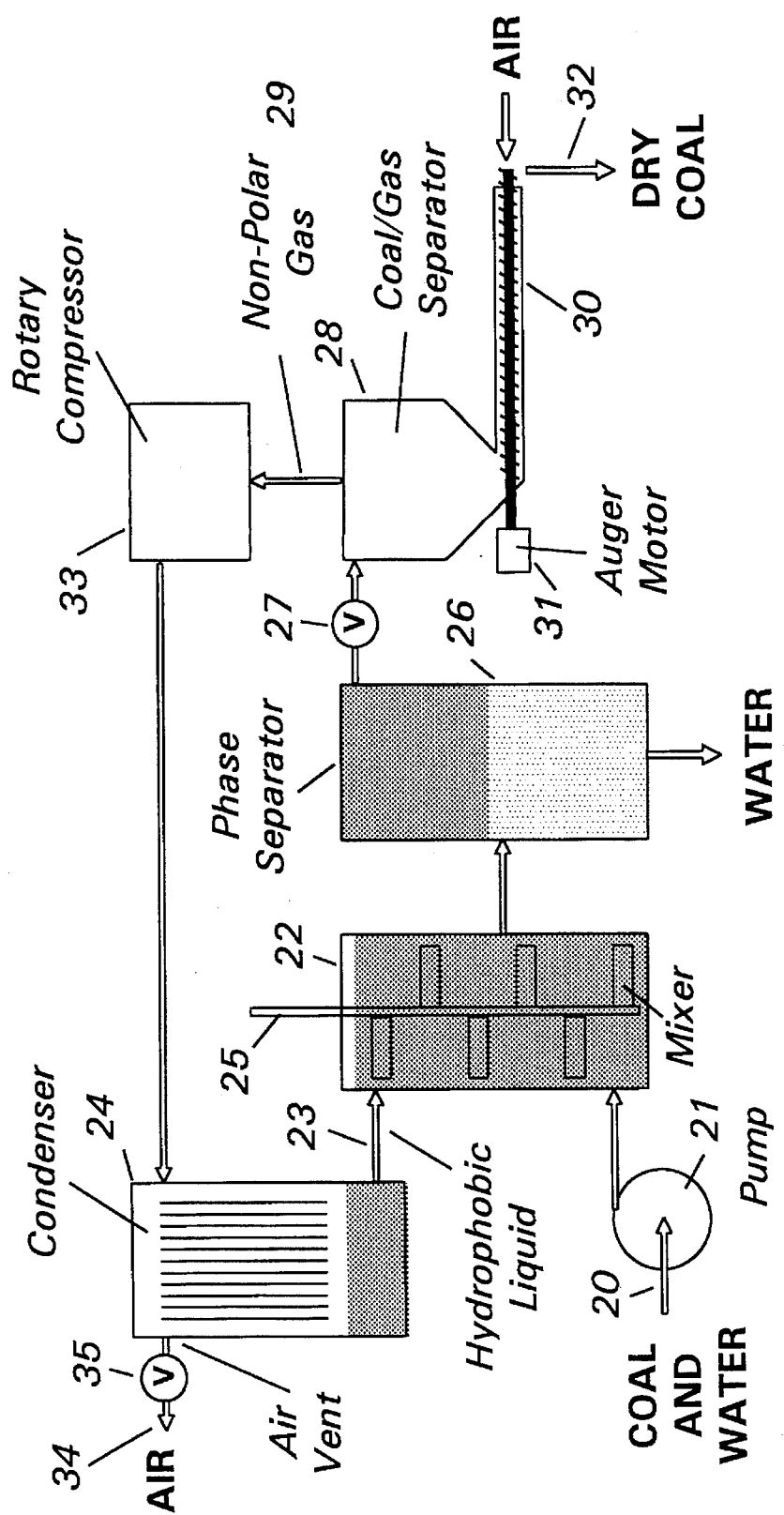
FIG. 2 is a schematic diagram showing equipment and flow sheet used to dewater fine coals.

A different embodiment of the process is given in FIG. 2, in which an aqueous coal slurry 20 is directed by a pump 21 into a mixing chamber 22 along with a non-polar, hydrophobic liquid 23 sent from condenser 24 into the mixing chamber 22. The mixing chamber 22 is kept at a pressure sufficient to maintain the hydrophobic compound in its liquid form. An agitator or stirring paddle 25 creates turbulence inside the mixing chamber 22 so that there is a good contact between the coal particles and the droplets of the hydrophobic liquid. Upon contact between the coal particles and the hydrophobic liquid droplets, the latter displaces water from the coal surfaces.

The mixure of coal, water and hydrophobic liquid is then transferred to a phase separator 26, where the water is phase-separated from the hydrophobic liquid containing fine coal particles. The amount of the hydrophobic liquid is controlled so that the phase-separation can be achieved without entraining water.

The phase-separated hydrophobic liquid containing coal particles is removed via a valve 27 to a coal/gas separator 28, where the pressure is reduced or the temperature raised so that the non-polar liquid is recovered in gaseous form 29. An auger 30 driven by a motor 31 transports the dry coal product 32 to storage, end use, or further processing stages, while the non-polar gas 29 is recycled for reuse. The non-polar gas containing some entrained air is compressed using a rotary compressor 33 in order to transform the non-polar gas 29 into liquid 23. Before venting the entrained air 34 into the atmosphere, the mixture of the non-polar liquid and air is sent to a condenser 24, so that the vapor pressure of the non-polar liquid is reduced, thereby minimizing the loss of the non-polar liquid. Air vent 35 allows the air to escape the condenser 24 after condensation has occured.

Figure 3:
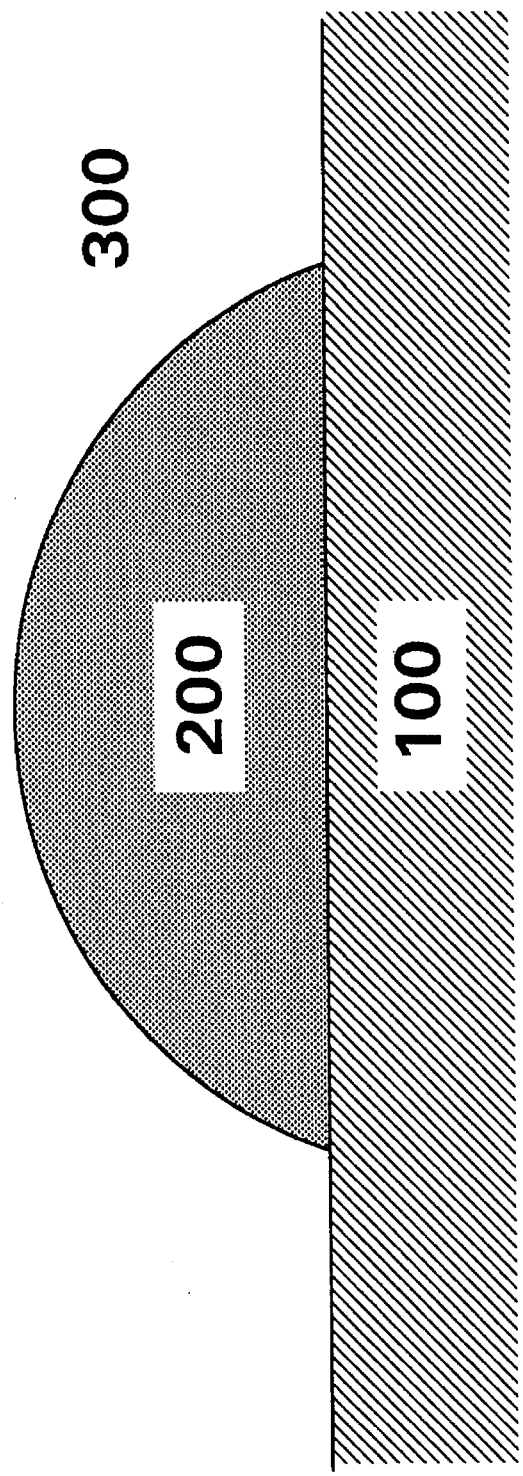
FIG. 3 is a diagram showing the interface between the coal, hydrophobic liquid, and water at the surface of coal particle.

FIG. 3 illustrates another schematic representation of the dewatering process as described in the present invention. It shows that a drop of hydrophobic liquid 200 positioned on a coal surface 100 immersed in water 300. When the hydrophobic liquid displaces the water from the surface, the contact area between the coal and the hydrophobic liquid will increase at the expense of the contact area between the coal surface and water. In order for the displacement to occur spontaneously, the free energy associated with it ($\Delta G_{dis}$) should be negative as follows:

$$\Delta G_{dis} = (\gamma_{12} + \gamma_{23} - \gamma_{13}) dA < 0 \qquad \text{Eq. 1}$$

in which $\gamma_{12}$ is the interfacial tension between the coal surface 100 and the hydrophobic liquid 200, $\gamma_{23}$ the same between the hydrophobic liquid 200 and water 300, $\gamma_{13}$ the same between the coal surface 100 and water 300, and dA is the change in the contact area between the coal surface and the hydrophobic liquid.

By dividing Eq. 1 with dA, one can obtain the following relationship:

$$(dG_{dis}/dA) = \gamma_{12} + \gamma_{23} - \gamma_{13} < 0 \qquad \text{Eq. 2}$$

in which $dG_{dis}/dA$ is the free energy of displacement per unit area. One can substitute the following relationships:

$$\gamma_{12} = \gamma_1 + \gamma_2 - 2\sqrt{\gamma_1^d \gamma_2^d} - 2\sqrt{\gamma_1^p \gamma_2^p} \qquad \text{Eq. 3}$$

$$\gamma_{23} = \gamma_2 + \gamma_3 - 2\sqrt{\gamma_2^d \gamma_3^d} - 2\sqrt{\gamma_2^p \gamma_3^p} \qquad \text{Eq. 4}$$

$$\gamma_{13} = \gamma_1 + \gamma_3 - 2\sqrt{\gamma_1^d \gamma_3^d} - 2\sqrt{\gamma_1^p \gamma_3^p} \qquad \text{Eq. 5}$$

which are generally known as Fowkes equation, and where $\gamma_1$ is the surface tension of coal, $\gamma_2$ is the surface tension of the hydrophobic liquid, $\gamma_3$ is the surface tension of water, the superscript d refers to the dispersion component of the respective surface tension, and the superscript p refers to its polar component. Eq. 2 then becomes:

$$\frac{dG_{dis}}{dA} = 2\gamma_2 - 2(\sqrt{\gamma_1^d \gamma_2^d} + \sqrt{\gamma_1^p \gamma_2^p} + \sqrt{\gamma_2^d \gamma_3^d} + \sqrt{\gamma_2^p \gamma_3^p} - \sqrt{\gamma_1^d \gamma_3^d} - \sqrt{\gamma_1^p \gamma_3^p}) < 0$$

from which one can obtain the following relationship:

$$2\gamma_2 < (2\sqrt{\gamma_1^d \gamma_2^d} + 2\sqrt{\gamma_1^p \gamma_2^p}) + (2\sqrt{\gamma_2^d \gamma_3^d} + 2\sqrt{\gamma_2^p \gamma_3^p}) - (2\sqrt{\gamma_1^d \gamma_3^d} - 2\sqrt{\gamma_1^p \gamma_3^p})$$

which represents a thermodynamic criterion for the dewatering process as described in the present invention.

The term $2\gamma_2$ is the work of cohesion of the hydrophobic liquid, while the first, second and the third terms on the right-hand side of Eq. 7 represent the work of adhesion between coal and hydrophobic liquid, hydrophobic liquid and water, and coal and water, respectively. Therefore, Eq. 7 can be explained qualitatively as follows:

$$\left(\begin{array}{c}\text{Work of}\\ \text{Cohesion}\end{array}\right) < \left(\begin{array}{c}\text{Work of}\\ \text{Adhesion}\\ \text{of 2 on 1}\end{array}\right) + \left(\begin{array}{c}\text{Work of}\\ \text{Adhesion}\\ \text{of 2 on 3}\end{array}\right) - \left(\begin{array}{c}\text{Work of}\\ \text{Adhesion}\\ \text{of 3 on 1}\end{array}\right)$$

which states that for the hydrophobic liquid to displace the water from the coal surface, the work of cohesion of the liquid should be smaller than the sum of the work of adhesion of the liquid on coal and the work of adhesion of the liquid on water minus the work of adhesion water on coal. Usually, the work of adhesion of a hydrophobic liquid on water is significantly smaller than that between coal and hydrophobic liquid. Therefore, the thermodynamic criterion for dewatering by displacement dictates that the interaction energy between the hydrophobic liquid and coal should exceed that between the coal and water, and that the difference between the two be larger than the work of cohesion of the hydrophobic liquid.

Based on the thermodynamic reasoning discussed above, the non-polar liquids that can be used for the dewatering process as described in the present invention should have as high affinity as possible for the coal to be dewatered, which in turn suggests that the coal should be as hydrophobic as possible. Therefore, the dewatering process based on displacement works only with hydrophobic coals such as the bituminous and anthracite coals mined in eastern U.S. The interaction between the coal and hydrophobic liquid is driven by the hydrophobic force, which was first measured and reported in scientific literature in 1984 by Israelachivili and Pashley.

Another important criterion for the hydrophobic liquid is that its work of cohesion be as low as possible. At the same time, the non-polar liquids employed within the practice of this invention should have high enough vapor pressure so that they are in gaseous form at ambient or room temperature, but can readily be converted to liquid form through application of pressure.

Suitable non-polar, hydrophobic liquids that meet these criteria include the normal paraffinic hydrocarbons (such as ethane, propane, butane and pentane), aromatic compounds, and carbon dioxide. The most ideal non-polar liquid that can be used for dewatering may be butane which can be liquified at a pressure between 25–35 psi above atmosphere at ambient or room temperature. Mixtures of non-polar liquids (e.g., 5–95% butane and 5–95% propane) can also be used and may provide benefits in terms of cost and safety of operation.

EXAMPLE

The process of the present invention will be further illustrated by the following example. A 400 mesh bituminous coal from Pittsburgh No. 8 seam was dispersed in tap water to prepare a 5% by weight of coal slurry. The coal sample had been stored in a freezer to keep it from loosing its surface hydrophobicity due to superficial oxidation. Approximately 75 ml of the slurry was placed in a copper tubing with two valves on each end. With the tubing standing vertically, a stream of butane gas was injected through the valve at the bottom until the pressure was high enough to convert the gaseous butane into its liquid form. After closing the valve at the bottom, the mixture of coal, water and liquid butane was agitated for a few minutes by shaking the tubing vigorously by hand. The copper tubing was then let to stand vertically to allow phase-separation. The water was slowly removed from the tubing by opening the valve at the bottom. The valve was closed when the mixture of coal and butane began to come out of the tubing. At this point, what was left in the tubing was a mixture of mostly coal and butane in liquid form. The butane was removed from the coal by opening the valve at the top so that it can exit the copper tubing as gas. The coal was removed from the copper tubing and analyzed for moisture. The product coal assayed 3.6% moisture.

Figure 4B:
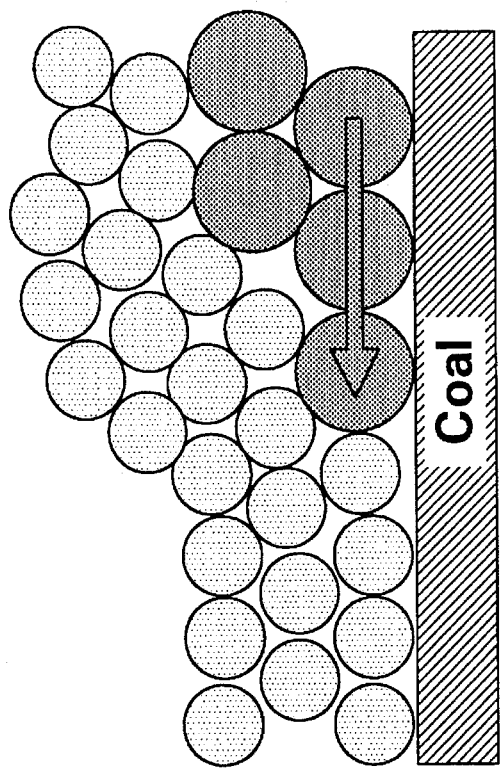
FIGS. 4a and 4b illustrate the thermal drying and dewatering by displacement mechanisms, respectively.
Figure 4A:
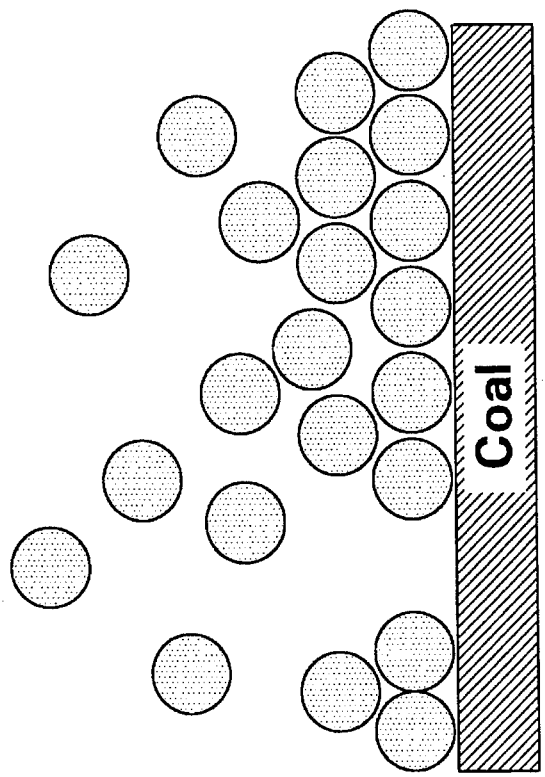

As such, the process is capable of dewatering coals containing a wide range of moisture (10–98% by weight). The moisture contents of the product is comparable to those by thermal drying, but requires significantly less energy. FIG. 4 illustrates the reason why the dewatering process described in the present invention should be cheaper than the thermal drying. In the latter, a large amount heat exceeding the latent heat of evaporation is required to remove all the water molecles which are deposited in multilayers. On the other hand, the dewatering process based on displacement as described in the present invention requires only the energy necessary to displace the water molecules in the first monolayer. The only significant energy consumption in the present invention would be to recycle the hydrophobic liquid, which is minimal as compared to thermal drying.

The displacement of water by an easily recoverable, non-polar liquid will provide substantial savings in energy costs since water will not need to be evaporated. Since the process can handle coal slurries and cakes having a wide range of solids contents, no other dewatering step is required to obtain suitable feed. Dust and explosion hazards are also reduced since no heating is involved. The process is capable of treating even the finest coal sizes with little difficulty.

While the invention has been described in terms of its preferred embodiments, those skilled in the art will recognize that the invention can be practiced with modification within the spirit and scope of the appended claims.

We claim:

1. A method for dewatering bituminous and anthracite coal fines, comprising the steps of:

adding to a mixture comprised of water and a hydrophobic coal selected from the group consisting of bituminous coal fines and anthracite coal fines, a quantity of at least one hydrophobic compound which is in a gaseous state under atmospheric pressure and in liquid state at higher pressures, said hydrophobic compound being under pressure and in said liquid state during said adding step, said quantity of said hydrophobic compound being sufficient to displace water from surfaces of said hydrophobic coal;

spontaneously displacing water from said surfaces of said hydrophobic coal while said hydrophobic compound is in its liquid state;

separating said hydrophobic compound and said hydrophobic coal from said water by the steps of
floating said hydrophobic compound and said hydrophobic coal on top of said water, and
recovering a binary composition of said hydrophobic compound and said hydrophobic coal from said mixture;

reducing the pressure of said binary composition to cause said hydrophobic compound to change to said gaseous state and separate from said hydrophobic coal;

collecting dried hydrophobic coal after said step of reducing pressure; and recycling said hydrophobic compound for use in said adding step.

2. The method of claim 1 wherein said hydrophobic compound is selected from the group consisting of ethane, propane, and butane.

3. The method of claim 2 wherein said hydrophobic compound is butane.

4. The method of claim 1 wherein said step of reducing pressure causes said hydrophobic compound to intermix with air, and wherein step of recycling includes the steps of:

pressurizing said hydrophobic compound to cause said hydrophobic compound to change to said liquid state;

condensing said hydrophobic compound; and separating said air intermixed with said hydrophobic compound during said releasing pressure step from said hydrophobic compound after condensing during said recycling step.

* * * * *